(12) United States Patent
Yang

(10) Patent No.: US 9,886,138 B2
(45) Date of Patent: Feb. 6, 2018

(54) TOUCH PANEL BASED ON TRIBOELECTRIFICATION, A DISPLAY DEVICE AND A CONTROLLING METHOD THEREFOR

(71) Applicant: BOE TECHNOLOGY GROUP CO., LTD., Beijing (CN)

(72) Inventor: Tian Yang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/313,100

(22) PCT Filed: Jan. 20, 2016

(86) PCT No.: PCT/CN2016/071445
§ 371 (c)(1),
(2) Date: Nov. 21, 2016

(87) PCT Pub. No.: WO2017/012318
PCT Pub. Date: Jan. 26, 2017

(65) Prior Publication Data
US 2017/0192611 A1    Jul. 6, 2017

(30) Foreign Application Priority Data
Jul. 22, 2015 (CN) .......................... 2015 1 0435518

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04105* (2013.01); *G06F 2203/04107* (2013.01)

(58) Field of Classification Search
CPC ....................................................... H02N 1/04
See application file for complete search history.

(56) References Cited

U.S. PATENT DOCUMENTS 6,310,612 B1 * 10/2001 Kotsubo ............... C09J 123/08
178/18.03
2002/0149561 A1 * 10/2002 Fukumoto .......... G01C 21/3664
345/156

(Continued)

FOREIGN PATENT DOCUMENTS

CN        103411710 A   * 11/2013
CN        104566121 A     4/2015

(Continued)

OTHER PUBLICATIONS

International Search Report and Written Opinion (including English translation of Box V.) dated Apr. 22, 2016, for corresponding PCT Application No. PCT/2016/071445.

(Continued)

*Primary Examiner* — Chad Dicke
*Assistant Examiner* — Robert Michaud
(74) *Attorney, Agent, or Firm* — Kinney & Lange, P.A.

(57) ABSTRACT

The present disclosure provides a touch panel based on triboelectrification, a display device and a controlling method therefor. The touch panel based on triboelectrification includes a cover plate; a touch sensing electrode, provided at one side of the cover plate; a transparent friction layer, provided at a side of the touch sensing electrode opposite to the cover plate, and arranged to contact with the touch sensing electrode; an elastic component layer, provided at a side of the transparent friction layer opposite to the touch sensing electrode and arranged to contact with the transparent friction layer, and including a plurality of elastic components spaced apart from each other; and a touch driving electrode, provided at a side of the elastic component (Continued)

layer opposite to the transparent friction layer, and arranged to contact with the elastic component layer. The plurality of elastic components in the elastic component layer vibrate in response to touch actions on the cover plate, so that the transparent friction layer becomes in contact with the touch driving electrode by means of friction, and thus a touch driving voltage is generated between the touch sensing electrode and the touch driving electrode. The touch panel based on triboelectrification can achieve the touch display of the display device without power supply.

17 Claims, 2 Drawing Sheets

(56)  References Cited

U.S. PATENT DOCUMENTS

| | | | |
|---|---|---|---|
| 2003/0090803 A1* | 5/2003 | Kusuda | G02F 1/133 |
| | | | 359/601 |
| 2008/0026318 A1* | 1/2008 | Schultz | H01L 24/11 |
| | | | 430/270.1 |
| 2009/0160796 A1 | 6/2009 | Jiang et al. | |
| 2013/0049531 A1 | 2/2013 | Wang et al. | |
| 2014/0073090 A1* | 3/2014 | Mizusawa | H01L 23/3114 |
| | | | 438/114 |
| 2014/0210313 A1* | 7/2014 | Kim | H01L 41/113 |
| | | | 310/339 |
| 2014/0338458 A1* | 11/2014 | Wang | G01L 1/005 |
| | | | 73/658 |
| 2015/0194911 A1 | 7/2015 | Kim et al. | |

FOREIGN PATENT DOCUMENTS

| | | |
|---|---|---|
| CN | 104682768 A | 6/2015 |
| CN | 104765479 A | 7/2015 |
| CN | 105138160 A | 12/2015 |

OTHER PUBLICATIONS

First Chinese Office Action, for Chinese Patent Application No. 201510435518.2, dated Jul. 19, 2017, 13 pages.

\* cited by examiner

TOUCH PANEL BASED ON TRIBOELECTRIFICATION, A DISPLAY DEVICE AND A CONTROLLING METHOD THEREFOR

CROSS-REFERENCE TO RELATED APPLICATION

This application is a Section 371 National Stage Application of International Application No. PCT/CN2016/071445, filed on Jan. 20, 2016, entitled "A Touch Panel Based On Triboelectrification, A Display Device and A Controlling Method Therefor", which has not yet published, and which claims priority to Chinese Application No. 201510435518.2, filed on Jul. 22, 2015, incorporated herein by reference in their entirety.

BACKGROUND OF THE INVENTION

Field of the Invention

The present disclosure relates to a technical filed of display, more particularly, to a touch panel based on triboelectrification, a display device and a controlling method therefor.

Description of the Related Art

A touch panel is used as a particular periphery device for a computer, and capable of providing a human-computer interaction interface between an electronic system and a user. It has been widely used in the technical field of display, for example, in a mobile phone, a personal digital assistant (PDA), a game console, a liquid crystal display (LCD), a plasma display panel (PDP) or the like.

However, in use of the touch panel, the user often needs a power supply for it. Therefore, it is impossible to use the touch panel without the power supply.

SUMMARY

Embodiments of the present disclosure provide a touch panel based on triboelectrification, a display device and a controlling method therefor, which can solve the problem that the touch panel cannot be used without the power supply.

In order to achieve the above object, embodiments of the present disclosure adopt the following technical solutions:

According to one aspect of the present application, it provides a touch panel based on triboelectrification, including: a cover plate; a touch sensing electrode, provided at one side of the cover plate; a transparent friction layer, provided at a side of the touch sensing electrode opposite to the cover plate, and arranged to contact with the touch sensing electrode; an elastic component layer, provided at a side of the transparent friction layer opposite to the touch sensing electrode and arranged to contact with the transparent friction layer, wherein the elastic component layer includes a plurality of elastic components spaced apart from each other; and a touch driving electrode, provided at a side of the elastic component layer opposite to the transparent friction layer, and arranged to contact with the elastic component layer; wherein the plurality of elastic components in the elastic component layer vibrate in response to touch actions on the cover plate, so that the transparent friction layer frictionally contacts with the touch driving electrode, and thus a touch driving voltage is generated between the touch sensing electrode and the touch driving electrode.

The touch panel based on triboelectrification can achieve the touch display of the display device without power supply.

In one example, a material of the transparent friction layer includes Fluorinated Ethylene Propylene copolymer.

In one example, a deformation rate of the elastic component is 10-15%, and a rebound ratio thereof is larger than or equal to 95%.

In one example, the elastic component is mainly composed of a photo resist material.

In one example, the photo resist material includes 50-90% ether or ester solvent, 5-20% acrylic ester monomers, 5-7% acrylic ester polymer, 0.1-2% disperser, and 0.1-5% initiator.

In one example, the photo resist material further includes at least one of acrylic particles and inorganic filler particles.

In one example, the inorganic filler particles include calcium carbonate having a grain size of 1-11 µm, ultra-fine ceramic having a grain size of 0.09 µm, or a silastic sphere having a grain size of 3-10 µm.

In one example, the elastic component has a thickness in a range of 5-40 µm.

In one example, a cross-section of the elastic component parallel to the cover plate has a shape of circle, rectangle or triangle, and a longitudinal cross-section of the elastic component perpendicular to the cover plate has a shape of trapezoid.

In one example, the touch sensing electrode includes a plurality of strip-like sub-electrodes arranged along a first direction, and the touch driving electrode includes a plurality of strip-like sub-electrodes arranged along a second direction, wherein the first direction intersects with the second direction.

In one example, a material for forming the touch sensing electrode and the touch driving electrode comprises a transparent conductive material.

In one example, a material for forming the cover plate is a glass or resin material having a dielectric constant of 3.5-3.7.

According to another aspect of the present application, it provides a display device, including a display panel and any kind of the touch panel based on triboelectrification as described above provided at a display side of the display panel.

In one example, the display device further includes a pressure sampler, a driver and a vibrator; the touch panel based on triboelectrification is provided at a display side of the display panel; the pressure sampler is connected with the touch panel based on triboelectrification and the driver, and configured to sample touch pressures on the touch panel based on triboelectrification and send a sampling signal to the driver; the driver is also connected to the vibrator, and configured to drive the vibrator to vibrate according to the sampling signal; the vibrator is also connected to the touch panel based on triboelectrification, and configured to drive the elastic component in the touch panel based on triboelectrification to vibrate.

In one example, the touch panel based on triboelectrification is bonded to the display panel at a periphery thereof by an adhesive layer, which has a thickness in a range of 0.4-0.6 mm.

In one example, an insulation layer and a shielding layer which contact with each other, are provided between the touch panel based on triboelectrification and the display panel, wherein the insulation layer contacts with the touch panel based on triboelectrification, and the shielding layer contacts with the adhesive layer.

In one example, the display panel is a LCD display panel, wherein a polarizer is provided between the cover plate and the touch sensing electrode of the touch panel based on triboelectrification.

In one example, the display panel is a LCD display panel, wherein an antireflection layer is provided between the cover plate and the touch sensing electrode of the touch panel based on triboelectrification.

According to a further aspect of the present application, it provides a controlling method for a display device, the controlling method including: receiving a touch signal by the touch panel based on triboelectrification; sampling touch pressures on the touch panel based on triboelectrification by the pressure sampler according to the touch signal, and sending the sampling signal to the driver; driving the vibrator to vibrate by the driver according to the sampling signal; making the elastic component in the touch panel based on triboelectrification vibrate under driving of the vibrator, so that the transparent friction layer in the touch panel based on triboelectrification and the touch driving electrode frictionate with each other and charges are generated, thereby generating a touch driving voltage between the touch driving electrode and the touch sensing electrode.

Embodiments of the present application provide a touch panel based on triboelectrification, a display device and a controlling method therefor. The touch panel based on triboelectrification includes a cover plate, and a touch sensing electrode and a touch driving electrode attached to the cover plate and located in different layers respectively, wherein the touch sensing electrode is located close to the cover plate with respect to the touch driving electrode. The elastic component is provided between the touch sensing electrode and the touch driving electrode. Furthermore, the touch panel based on triboelectrification also includes a transparent friction layer, one side surface of which contacts with the touch sensing electrode and the other side surface of which contacts with the elastic component. In this way, during the touching process, when a finger contacts the cover plate of the touch panel based on triboelectrification, the elastic component will be deformed due to the applied force so that the transparent friction layer becomes in contact with the touch driving electrode within spaces between the elastic components; after the finger leaves the touch sensing electrode, the elastic component will vibrate due to the deformation recovery, so that friction will occur during a contact process of the transparent friction layer and the touch driving electrode. Positive charges generated by friction are derived by means of the touch sensing electrode and negative charges generated by friction can be derived by means of the touch driving electrode, in order to transform a mechanical energy in the touch process into an electrical energy. In addition, the electrical energy generated by friction can load a touch driving signal onto the touch driving electrode and detect a sensed voltage signal of the touch sensing electrode which is coupled out by mutual capacitance. Because a capacitance value of the mutual capacitance will change when the finger touches the touch panel, the above described sensed voltage signal will be changed, and thus a position of a touch point can be determined according to the change of the sensed voltage signal. In conclusion, an object of touch display based on triboelectrification will be obtained by the touch panel based on triboelectrification.

BRIEF DESCRIPTION OF THE DRAWINGS

In order to make technical solutions of embodiments of the present disclosure or in the art become clear, the drawings used in the embodiments or in the art are briefly discussed. It is obvious that the drawings in the followings are only referred to some embodiments of the present disclosure, and thus the person skilled in the art can obtain other drawings based on the above drawings without any creative efforts.

LIST OF REFERENCE SIGNS

01—touch panel based on triboelectrification; 10—touch sensing electrode;
11—touch driving electrode; 12—elastic component; 13—transprent friction layer;
20—display panel; 21—adhesive layer; 22—insulating layer; 23—shielding layer;
24—cover plate; 30—pressure sampler; 31—driver; 32—vibrator

DETAILED DESCRIPTION OF PREFERRED EMBODIMENTS OF THE INVENTION

Below, technical solutions of embodiments of the present application will be clearly and completely described with reference to figures related to the embodiments. It is obvious that the described embodiments are only a part of the embodiments of the present application, rather than all of the embodiments. On the basis of the embodiments of the present application, other embodiments which are obtained by the person skilled in the art without any creative efforts, will also fall within the scope of the present application.

Figure 1:
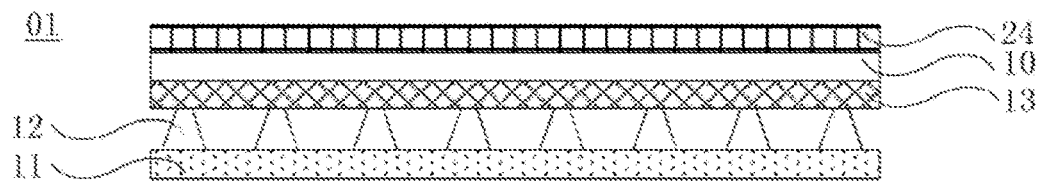
FIG. 1 is a schematic view for showing a structure of a touch panel based on triboelectrification in accordance with an embodiment of the present application.

As shown in FIG. 1, an embodiment of the present application provides a touch panel 01 based on triboelectrification. It includes a cover plate 24, and a touch sensing electrode 10 and a touch driving electrode 11 located in different layers respectively and attached to the cover plate 24. The touch sensing electrode 10 is located closer to the cover plate 24 than the touch driving electrode 11. An elastic component layer is provided between the touch sensing electrode 10 and the touch driving electrode 11, and includes a plurality of elastic components 12 spaced apart from each other.

In addition, the touch panel based on the triboelectrification may further include a transparent friction layer 13, one side surface of which contacts with the touch sensing electrode 10 and the other side surface of which contacts with the elastic component 12.

It should be noted that in order to improve touch sensing sensitivity of the touch display panel, the materials for forming the above cover plate 24 can be glass or resin materials having a dielectric constant in a range of 3.5 to 3.7.

The touch panel based on triboelectrification in accordance with an embodiment of the present application includes a cover plate, and a touch sensing electrode and a touch driving electrode attached to the cover plate and located in different layers respectively, wherein the touch sensing electrode is located close to the cover plate with respect to the touch driving electrode. The elastic component is provided between the touch sensing electrode and the touch driving electrode. Furthermore, the touch panel based on triboelectrification also includes a transparent friction layer, one side surface of which contacts with the touch sensing electrode and the other side surface of which contacts with the elastic component. In this way, during the touching process, when a finger contacts the touch panel based on triboelectrification, the elastic component will be deformed due to the applied force so that the transparent friction layer becomes in contact with the touch driving electrode; after the finger leaves the touch sensing electrode, the elastic component will vibrate due to the deformation recovery, so that friction will occur during a contact process of the transparent friction layer and the touch driving electrode. Positive charges generated by friction are derived by means of the touch sensing electrode and negative charges generated by friction can be derived by means of the touch driving electrode, in order to transform a mechanical energy in the touch process into an electrical energy. The electrical energy generated by friction can load a touch driving signal onto the touch driving electrode and detect an induced voltage signal of the touch sensing electrode which is coupled out by mutual capacitance. Because a capacitance value of the mutual capacitance will change when the finger touches the touch panel, the above described induced voltage signal will be changed, and thus a position of a touch point can be determined according to the change of the induced voltage signal. In conclusion, an object of touch display based on triboelectrification will be obtained by the touch panel based on triboelectrification.

Below, structures of various film layers and components in the touch panel based on triboelectrification will be illustratively described in detail.

In order to improve the effect of triboelectrification, the material of the transparent friction layer 13 can include polyvinyl fluoride compound, for example Fluorinated Ethylene Propylene (FEP) copolymer.

In addition, when an external force is exerted on the elastic component 12, relative positions of various points on the elastic component 12 will change; while after withdrawing the external force, the elastic component 12 will restore to its original shape. Specifically, the elastic component 12 will vibrate many times during the restoration to its original shape, and amplitude of vibration will decrease progressively, and finally it reaches a stationary state. In order to increase the times of vibration of the elastic component 12 during the restoration to its original shape without affecting the touch, a deformation rate of the elastic component 12 can be in a range of 10-15%, and a rebound ratio thereof can be larger than or equal to 95%. It should be noted that the deformation rate of the elastic component 12 is meant to a ratio of a length of the deformed elastic component 12 due to the application of the external force to a length of the elastic component 12 in its original state (i.e., no external force is applied). In addition, the rebound ratio of the elastic component 12 is meant to a ratio of a restoration length of the elastic component 12 after releasing the external force to a length of the elastic component 12 in its original state (i.e., no external force is applied).

The elastic component 12 can be made of resin materials having good elasticity. For example, it can be made of a photo resist material. The photo resist material can include (by weight percent) 50-90% ether or ester solvent, 5-20% acrylic ester monomers, 5-7% acrylic ester polymer, 0.1-2% disperser, and 0.1-5% initiator. The above material may form the photo resist having a relatively high elasticity.

Specifically, the elastic component 12 is made of the photo resist material by means of a process of exposing and etching mask. In one example, firstly a photo resist film layer is formed on the touch driving electrode 11 by spraying or coating and is processed by a vacuum drying, and finally a photo resist film layer having a thickness in a range of 5-40 µm is obtained. When the thickness of the photo resist film layer is less than 5 µm, it will cause a deformation amount of the formed elastic component 12 too small, thereby it can restore to its original shape within a very little time period. In this way, the times of the contact and friction between the transparent friction layer 13 and the touch driving electrode 11 will be reduced, so that the times of the charges generated during the triboelectrification will be reduced. In contrast, when the thickness of the photo resist film layer is larger than 40 µm, it will result in increase of the thickness of the touch panel and is detrimental to a ultra thin design trend of the display panel, though the deformation amount of the elastic component 12 will become large and be beneficial to increasing the times and duration time of the contact and friction between the transparent friction layer 13 and the touch driving electrode 11.

Next, the photo resist film layer can be exposed to light by the mask having a predetermined pattern. When the photo resist material is a positive photo resist, after the developing step, the photo resist of the exposed part can be resolved so as to form the elastic component 12. Alternatively, when the photo resist material is a negative photo resist, after the subsequent developing step, the photo resist of the non-exposed part can be resolved so as to form the elastic component 12. Since the mask can be provided with different shapes of the predetermined pattern, the elastic component 12 can have different horizontal cross-section shapes, such as, circle, rectangular, triangle or the like. The horizontal cross-section is parallel to the cover plate 24. In addition, in order to enhance the stability of the elastic component 12, the shape of the longitudinal cross-section of the elastic component 12 is shown in FIG. 1, specifically in a form of trapezoid. The longitudinal cross-section is perpendicular to the horizontal cross-section.

On this basis, in order to increase toughness of the photo resist material so that it can produces shear yield and absorb a great deal of plastic deformation energy when a force is applied, the photo resist material having high elasticity can be added with at least one of acrylic particles and inorganic filler particles. The inorganic filler particles can be calcium carbonate having a grain size of 1-11 µm, ultra-fine ceramic having a grain size of 0.09 µm, or a silastic sphere having a grain size of 3-10 µm.

Figure 2:
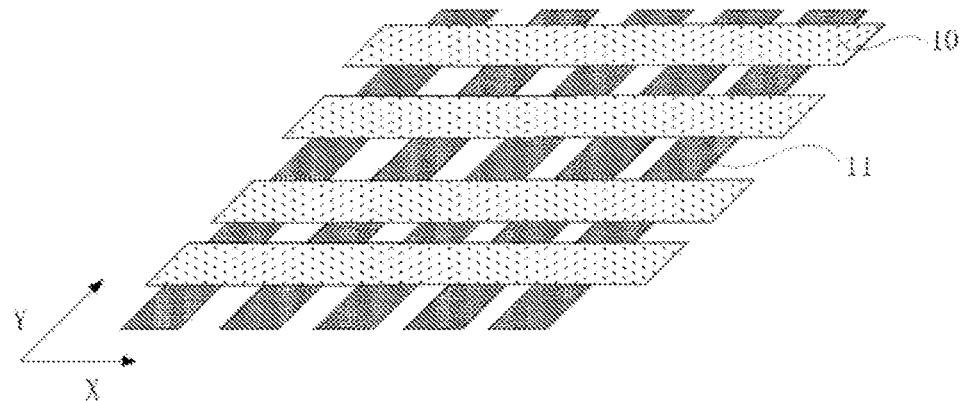
FIG. 2 is a schematic view for showing a structure of a touch sensing electrode and a touch driving electrode as shown in FIG. 1.

In addition, as shown in FIG. 2, the touch sensing electrode 10 can be composed of a plurality of strip-like sub-electrodes arranged along a first direction X and the touch driving electrode 11 can be composed of a plurality of strip-like sub-electrodes arranged along a second direction Y. The first direction X intersects with the second direction Y. In this way, the mutual capacitance is formed between the touch sensing electrode 10 and the touch driving electrode 11. At the touch stage, when the touch driving signal is loaded onto the touch driving electrode 11, the induced voltage signal of the touch sensing electrode 10 which is coupled out by the mutual capacitance is detected. During such process, once the human body contacts the touch panel, an electric field of the human body will act on the mutual capacitance, so that the capacitance value of the mutual capacitance will change, and thus the sensed voltage signal of the touch sensing electrode 10 coupled out by the mutual capacitance will change. The position of the touch point can be determined based on the change of the induced voltage signal. Of course, the present application does not make any limitation to the shape of the touch sensing electrode 10 and the touch driving electrode 11, for example the shape of the touch sensing electrode 10 and the touch driving electrode 11 can be blocky, and there is no overlapping region between the touch sensing electrode 10 and the touch driving electrode 11. In this way, when the blocky touch sensing electrodes 10 located in the same row are connected with each other along the first direction X, and the blocky touch driving electrodes 11 located in the same column are connected with each other along the second direction Y, the touch can be also achieved.

It should be noted that firstly, it is preferable to locate the first direction X perpendicular to the second direction Y; and secondly the materials for forming the touch sensing electrode 10 and the touch driving electrode 11 can include transparent conductive materials, for example Indium Tin Oxides (ITO) or Indium Zinc Oxides (IZO).

Figure 3:
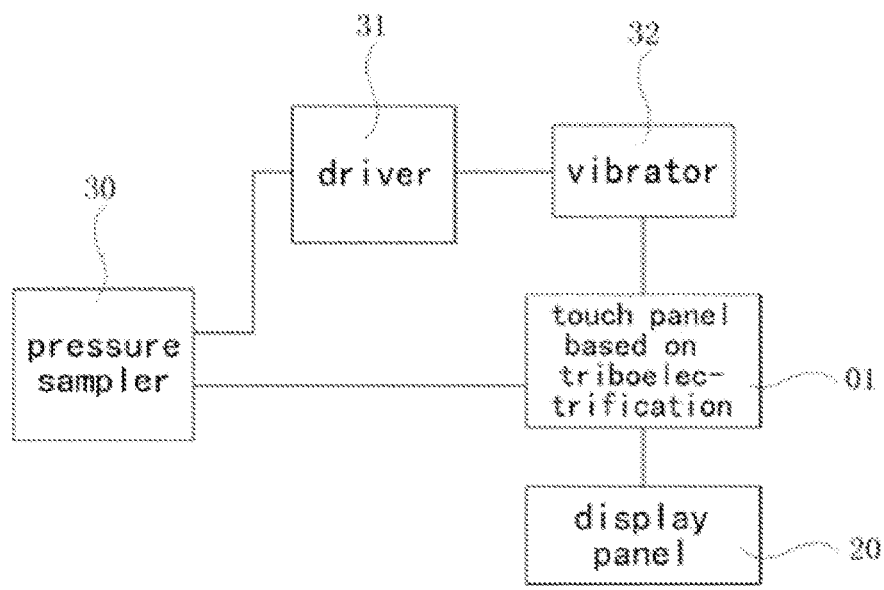
FIG. 3 is a schematic view for showing a structure of a display device in accordance with an embodiment of the present application.

As shown in FIG. 3, an embodiment of the present application provides a display device, including any kind of a touch panel 01 based on triboelectrification as described above and a display panel 20. The touch panel 01 is provided at a display side of the display panel 20. The display panel 20 can be a flat-panel device having display function, such as TFT-LCD (Thin Film Transistor Liquid Crystal Display) or Organic Light Emitting Diode (OLED) display panel. The present application does not make any limitations on this point.

It should be noted that when the display panel 20 is a LCD display panel, since the LCD display panel needs two polarizers having polarization directions perpendicular to each other, one polarizer can be provided between the array substrate and the backlight module of the LCD display panel; and the other one can be provided between the cover plate 24 and the touch sensing electrode 10. In addition, in order to improve the display effect, it is also possible to provide an optical film, such as an antireflection layer between the cover plate 24 and the touch sensing electrode 10.

The display device in accordance with an embodiment of the present application includes a display panel and a touch panel based on triboelectrification located at a display side of the display panel. In this way, during the touching process, when a finger contacts the touch panel based on triboelectrification, the elastic component will be deformed due to the applied force so that the transparent friction layer becomes in contact with the touch driving electrode; after the finger leaves the touch sensing electrode, the elastic component will vibrate due to the deformation recovery, so that friction will occur during a contact process of the transparent friction layer and the touch driving electrode. Positive charges generated by friction are derived by means of the touch sensing electrode and negative charges generated by friction can be derived by means of the touch driving electrode, in order to transform a mechanical energy in the touch process into an electrical energy. In addition, the electrical energy generated by friction can load a touch driving signal onto the touch driving electrode and detect a sensed voltage signal of the touch sensing electrode which is coupled out by mutual capacitance. Because a capacitance value of the mutual capacitance will change when the finger touches the touch panel, the above described sensed voltage signal will be changed, and thus a position of a touch point can be determined according to the change of the sensed voltage signal. In conclusion, an object of touch display based on triboelectrification will be obtained by the touch panel based on triboelectrification.

In addition, in order to make the touch panel 01 based on triboelectrification supply the electrical energy continuously and stably, the display device further may include a pressure sampler 30, a driver 31 and a vibrator 32.

In such condition, the pressure sampler 30 is connected with the touch panel 01 based on triboelectrification and the driver 31, so as to sample touch pressures on the touch panel 01 based on triboelectrification and send the sampling signal to the driver 31.

The driver 31 is also connected to the vibrator 32, so as to drive the vibrator 32 to vibrate in accordance with the sampling signal. For example, when the touch pressure on the touch panel 01 based on triboelectrification sampled by the pressure sampler 30 is relatively large, the sampling signal sent to the driver 31 by it is relatively strong. As such, the driver 31 can control the vibrator 32 so as to vibrate in a relatively high frequency. When the touch pressure on the touch panel 01 based on triboelectrification sampled by the pressure sampler 30 is relatively small, the sampling signal sent to the driver 31 by it is relatively weak. As such, the driver 31 can control the vibrator 32 so as to vibrate in a relatively low frequency.

Furthermore, the vibrator 32 is also connected to the touch panel 01 based on triboelectrification, and thus under the driving of the driver 31, the vibrator 32 can vibrate continuously to cause continuous vibration of the elastic component 12 in the touch panel 01 based on triboelectrification, so that the transparent friction layer 13 and the touch driving electrode 10 are contacted mutually and the friction is generated continuously therebetween. In this way, the charges are continuously and stably generated during the friction and provided to the touch panel based on triboelectrification, for achieving the touch display.

Figure 4:
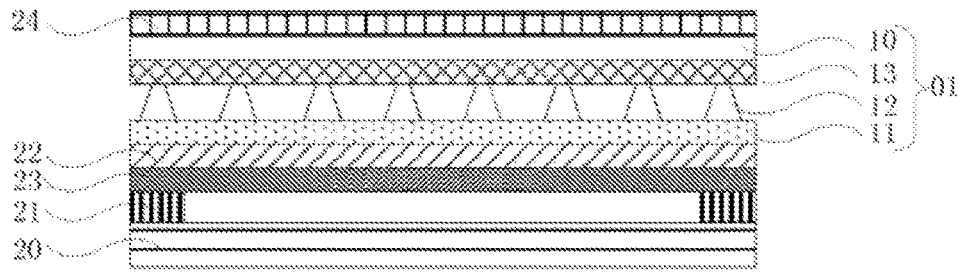
FIG. 4 is a schematic view for showing a connecting structure between the touch panel based on triboelectrification and the display panel.

Further, as shown in FIG. 4, the touch panel 01 based on triboelectrification are bonded to the display panel 20 at the periphery thereof by an adhesive layer 21, which has a thickness in a range of 0.4-0.6 mm. Because the touch panel 01 based on triboelectrification and the display panel 20 are bonded together only at the periphery thereof by the adhesive layer 21, there is an air gap having a thickness of 0.4-0.6 mm formed between the touch panel 01 based on triboelectrification and the display panel 20. Such air gap can reduce the radiation noise and parasitic capacitance of the display panel 20 to the touch panel 01 based on triboelectrification.

Furthermore, in order to better prevent the bad influence to the touch panel 01 based on triboelectrification due to the interference generated by the display panel 20, as shown in FIG. 4, an insulation layer 22 and a shielding layer 23 which contact with each other, are provided between the touch panel 01 based on triboelectrification and the display panel 20. The insulation layer 22 further contacts with the touch panel 01 based on triboelectrification and the shielding layer 23 further contacts with the adhesive layer 21.

Figure 5:
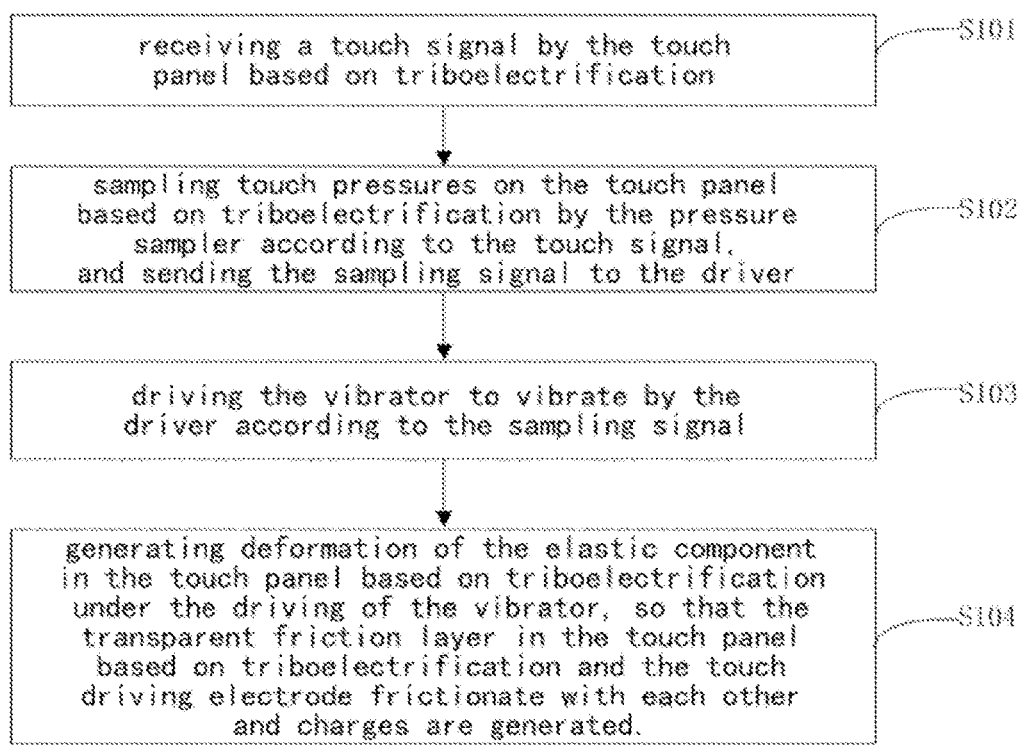
FIG. 5 is a flowchart of a controlling method for the display device in accordance with an embodiment of the present application.

An embodiment of the present application provides a controlling method for the display device. As shown in FIG. 3, the display device includes a touch panel 01 based on triboelectrification, a display panel 20, a pressure sampler 30, a driver 31 and a vibrator 32. As shown in FIG. 5, the controlling method can include:

S101, receiving a touch signal by the touch panel 01 based on triboelectrification;

S102, sampling touch pressures on the touch panel 01 based on triboelectrification by the pressure sampler 30 according to the touch signal, and sending the sampling signal to the driver 31;

S103, driving the vibrator 32 to vibrate by the driver 31 according to the sampling signal;

S104, generating deformation of the elastic component 12 in the touch panel 01 based on triboelectrification under the driving of the vibrator 32, so that the transparent friction layer 13 in the touch panel 01 based on triboelectrification and the touch driving electrode 10 frictionate with each other and charges are generated.

The controlling method for the display device in accordance with the embodiment of the present application includes firstly receiving a touch signal by the touch panel based on triboelectrification; then sampling touch pressures on the touch panel based on triboelectrification by the pressure sampler according to the touch signal, and sending the sampling signal to the driver; after that, driving the vibrator to vibrate by the driver according to the sampling signal; and finally generating deformation of the elastic component in the touch panel based on triboelectrification under the driving of the vibrator, so that the transparent friction layer in the touch panel based on triboelectrification and the touch driving electrode frictionate with each other and charges are generated. As such, the mechanical energy during the touch can be transformed into the electrical energy. In this way, the electrical energy generated by friction can load a touch driving signal onto the touch driving electrode and detect a sensed voltage signal of the touch sensing electrode which is coupled out by mutual capacitance. Because a capacitance value of the mutual capacitance will change when the finger touches the touch panel, the above described sensed voltage signal of the touch sensing electrode which is coupled out by the mutual capacitance will be changed, and thus a position of a touch point can be determined according to the change of the sensed voltage signal. In conclusion, an object of touch display based on triboelectrification will be obtained by the controlling method for the display device.

As described above, they are only the specific embodiments of the present application, but the scope of the present application is not limited to this. Changes or modifications which can be readily envisaged by the person skilled in the art within the technical disclosure thereof shall be covered by the protection scope of the present application. Therefore, the protection scope of the present application shall be only defined by the appended claims.

What is claimed is:

1. A touch panel based on triboelectrification, comprising:
a cover plate;
a touch sensing electrode, provided at one side of the cover plate;
a transparent friction layer, provided at a side of the touch sensing electrode opposite to the cover plate, and arranged to contact with the touch sensing electrode;
an elastic component layer, provided at a side of the transparent friction layer opposite to the touch sensing electrode and arranged to contact with the transparent friction layer, wherein the elastic component layer comprises a plurality of elastic components spaced apart from each other; and
a touch driving electrode, provided at a side of the elastic component layer opposite to the transparent friction layer, and arranged to contact with the elastic component layer;

wherein the plurality of elastic components in the elastic component layer are configured to vibrate in response to touch actions on the cover plate, so that the transparent friction layer frictionally contacts with the touch driving electrode, and thus a touch driving voltage is generated between the touch sensing electrode and the touch driving electrode;
wherein the elastic components are mainly composed of a photo resist material; and
wherein the photo resist material comprises 50-90% ether or ester solvent, 5-20% acrylic ester monomers, 5-7% acrylic ester polymer, 0.1-2% disperser, and 0.1-5% initiator.

2. The touch panel based on triboelectrification according to claim 1, wherein a material of the transparent friction layer comprises Fluorinated Ethylene Propylene copolymer.

3. The touch panel based on triboelectrification according to claim 1, wherein a deformation rate of the elastic components is 10-15%, and a rebound ratio thereof is larger than or equal to 95%.

4. The touch panel based on triboelectrification according to claim 1, wherein the photo resist material further comprises at least one of acrylic particles and inorganic filler particles.

5. The touch panel based on triboelectrification according to claim 4, wherein the inorganic filler particles comprise calcium carbonate having a grain size of 1-11 μm, ultra-fine ceramic having a grain size of 0.09 μm, or a silastic sphere having a grain size of 3-10 μm.

6. The touch panel based on triboelectrification according to claim 3, wherein the elastic components have a thickness in a range of 5-40 μm.

7. The touch panel based on triboelectrification according to claim 3, wherein a cross-section of the elastic components parallel to the cover plate has a shape of a circle, rectangle or triangle, and a longitudinal cross-section of the elastic components perpendicular to the cover plate has a shape of a trapezoid.

8. The touch panel based on triboelectrification according to claim 1, wherein the touch sensing electrode comprises a plurality of strip-like sub-electrodes arranged along a first direction, and the touch driving electrode comprises a plurality of strip-like sub-electrodes arranged along a second direction, wherein the first direction intersects with the second direction.

9. The touch panel based on triboelectrification according to claim 1, wherein a material for forming the touch sensing electrode and the touch driving electrode comprises a transparent conductive material.

10. The touch panel based on triboelectrification according to claim 1, wherein a material for forming the cover plate is a glass or resin material having a dielectric constant of 3.5-3.7.

11. A display device, comprising a display panel and the touch panel based on triboelectrification according to claim 1, the touch panel based on triboelectrification being provided at a display side of the display panel.

12. The display device according to claim 11, wherein the display device further comprises a pressure sampler, a driver and a vibrator; wherein:
the pressure sampler is connected with the touch panel based on triboelectrification and the driver, and is configured to sample touch pressures on the touch panel based on triboelectrification and send a sampling signal to the driver;

the driver is also connected to the vibrator, and configured to drive the vibrator to vibrate according to the sampling signal; and the vibrator is also connected to the touch panel based on triboelectrification, and configured to drive the elastic components in the touch panel based on triboelectrification to vibrate.

13. The display device according to claim 11, wherein the touch panel based on triboelectrification is bonded to the display panel at a periphery thereof by an adhesive layer, and the adhesive layer has a thickness in a range of 0.4-0.6 mm.

14. The display device according to claim 13, wherein an insulation layer and a shielding layer which contact with each other, are provided between the touch panel based on triboelectrification and the display panel, wherein the insulation layer contacts with the touch panel based on triboelectrification, and the shielding layer contacts with the adhesive layer.

15. The display device according to claim 11, wherein the display panel is a LCD display panel, wherein a polarizer is provided between the cover plate and the touch sensing electrode of the touch panel based on triboelectrification.

16. The display device according to claim 11, wherein the display panel is a LCD display panel, wherein an antireflection layer is provided between the cover plate and the touch sensing electrode of the touch panel based on triboelectrification.

17. A controlling method for a display device according to claim 12, wherein the controlling method comprises:

receiving a touch signal by the touch panel based on triboelectrification;

sampling touch pressures on the touch panel based on triboelectrification by the pressure sampler according to the touch signal, and sending the sampling signal to the driver;

driving the vibrator to vibrate by the driver according to the sampling signal; and making the elastic components in the touch panel based on triboelectrification vibrate under driving of the vibrator, so that the transparent friction layer in the touch panel based on triboelectrification and the touch driving electrode frictionally interact with each other and charges are generated, thereby generating a touch driving voltage between the touch driving electrode and the touch sensing electrode.

* * * * *